Sept. 20, 1966 J. H. HAM, JR., ET AL 3,274,345

CALL TRANSMITTER

Filed July 1, 1963 6 Sheets-Sheet 1

INVENTORS J. H. HAM, JR.
W. E. HOSTETLER
J. F. RITCHEY
W. R. TOLMAN

BY Harry L. Newman

ATTORNEY

CALL TRANSMITTER
Filed July 1, 1963 6 Sheets-Sheet 2
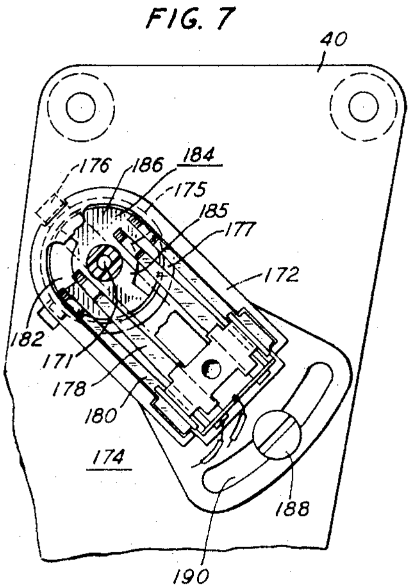
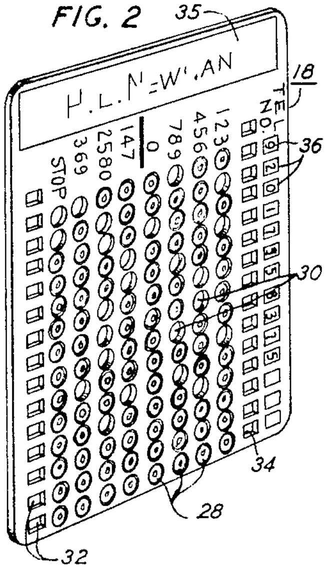
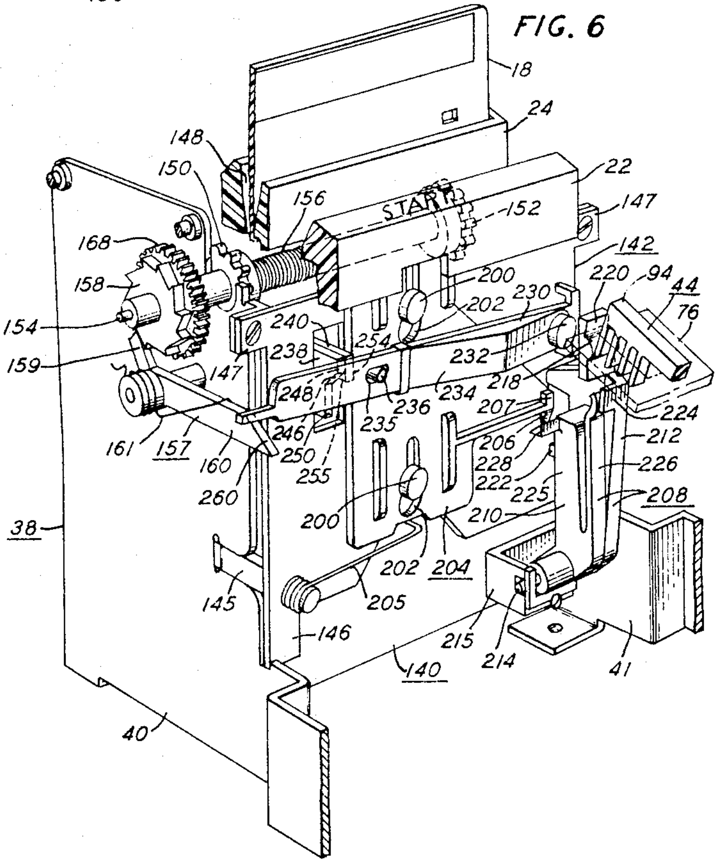

Sept. 20, 1966 J. H. HAM, JR., ET AL 3,274,345

CALL TRANSMITTER

Filed July 1, 1963 6 Sheets-Sheet 3

Sept. 20, 1966 J. H. HAM, JR., ETAL 3,274,345

CALL TRANSMITTER

Filed July 1, 1963 6 Sheets-Sheet 5

United States Patent Office 3,274,345

Patented Sept. 20, 1966

3,274,345

CALL TRANSMITTER

James H. Ham, Jr., and Willard E. Hostetler, Indianapolis, James F. Ritchey, Carmel, and Warren R. Tolman, Indianapolis, Ind.; said Tolman assignor to Western Electric Company, Incorporated, New York, N.Y., a corporation of New York, and said Ham, Hostetler, and Ritchey assignors to Bell Telephone Laboratories, Incorporated, New York, N.Y., a corporation of New York Filed July 1, 1963, Ser. No. 291,770

3 Claims. (Cl. 179—90)

This invention relates to telephone call transmitters and particularly to call transmitters for generating alternating current signals of selected frequencies.

An object of this invention is to provide an integrated multifrequency call transmitter, that is, a call transmitter employing a single signal generator that may be either manually or automatically operated to generate signals of more than one frequency.

This and other objects of this invention are achieved in an illustrative embodiment thereof wherein the call transmitter comprises a signal generator including a pair of resonant circuits capable of resonating at discrete frequencies. An amplifying means is coupled to the resonant circuits in such manner as to render the amplifying means capable of producing oscillations at the same frequencies as and in response to the resonating of the resonant circuits, and a switching means is provided for enabling the amplifying means and shock-exciting the resonant circuits into oscillation.

The call transmitter includes a pushbutton dial for manually operating the signal generator, the pushbutton dial comprising a cover member having a plurality of holes therein arranged in an array of longitudinal columns and transverse rows. A plurality of guide collars extend from the topside of the cover member and respectively encompass the holes, and a plurality of prestressing studs extend from the underside of the cover member. An individual pushbutton is situated in each of the holes in the cover member, each pushbutton being associated with a different digit which is characterized by two unique frequencies and each pushbutton further being movable between an extended position and a depressed position and being biased toward its extended position.

A plurality of longitudinal and transverse rotatable shafts are journaled in the cover member, an individual shaft extending along one side of each column and each row of pushbuttons. Each shaft has a plurality of projecting levers, and individual levers on each shaft respectively extend into the paths of travel of the individual pushbuttons alongside of which the shaft extends, whereby the depression of an individual pushbutton results in the rotation of a unique pair of shafts.

A pair of spring contacts for selecting a discrete frequency of one of the resonant circuits is associated with each shaft. A first contact of each pair is biased against a lever of its associated shaft and a second contact is biased against a prestressing stud on the cover member, the lever moving the first contact into engagement with the second contact upon rotation of the shaft.

A displaceable member having a plurality of cam surfaces is associated with the transverse shafts. Each cam surface is associated with an individual shaft and is in juxtaposition with one of the levers of the shaft, the rotation of any one of the transverse shafts displacing the displaceable member. The displaceable member extends into engagement with the switching means of the signal generator, and the displacement of the displaceable member results in the operation of the switching means. Thus upon actuation of any one of the pushbuttons a unique pair of shafts is rotated to close two pairs of frequency selecting spring contacts and displace the displaceable member to operate the switching means in a particular sequence.

The call transmitter also includes a repertory mechanism for automatically operating the signal generator responsive to coding on an encoded card, the mechanism comprising a plurality of code sensing members. An individual pair of spring contacts for selecting a discrete frequency of one of the resonant circuits is associated with each sensing member, the pairs of spring contacts being closed when the sensing members with which they are associated are actuated by the coding on the card. Means are provided for moving the encoded card past the sensing members, and a start member is provided for initiating the operation of the moving means. The actuation of the start member displaces the displaceable member of the pushbutton dial to operate the switching means of the signal generator, and the movement of the card past the sensing members causes the periodic actuation of discrete pairs of sensing members to close two pairs of frequency selecting spring contacts for each encoded digit.

While the invention is described in terms of being used as a call transmitter, it may also be employed as a data transmitter. The signals generated thereby can be used to both establish connections between a pair of substations and transmit data from one substation to the other.

A complete understanding of the invention and of these and other features and advantages thereof may be gained from consideration of the following detailed description taken in conjunction with the accompanying drawing wherein one embodiment of the invention is illustrated. It is to be expressly understood, however, that the drawing is for the purposes of illustration and description and is not to be construed as defining the limits of the invention.

In the drawing:

FIG. 2 is a perspective view of the encoded card that is employed in the automatic operation of the call transmitter;

Figure 3:
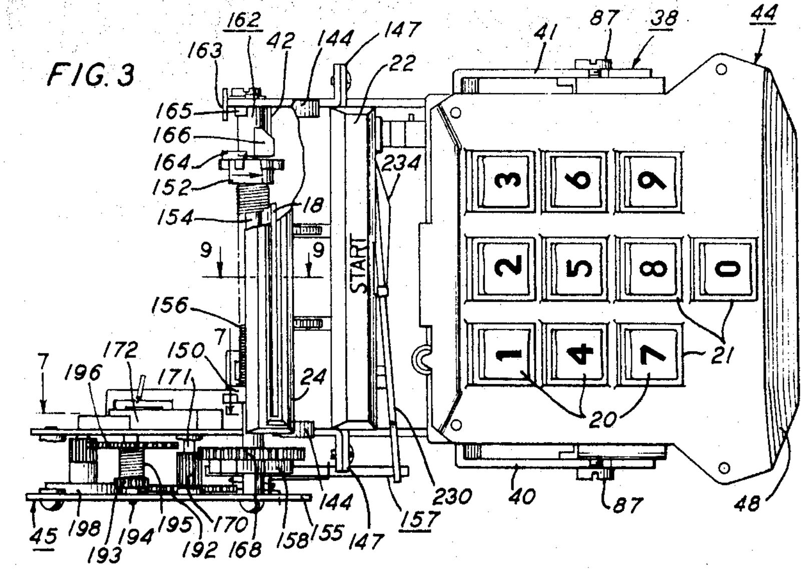
FIG. 3 is a top view of the call transmitter separated from the telephone set, a portion of an entryway for accommodating the encoded card being broken away for greater clarity.
Figure 5:
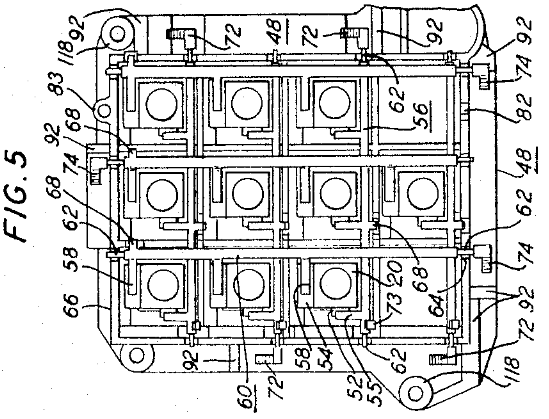
Figure 4A:
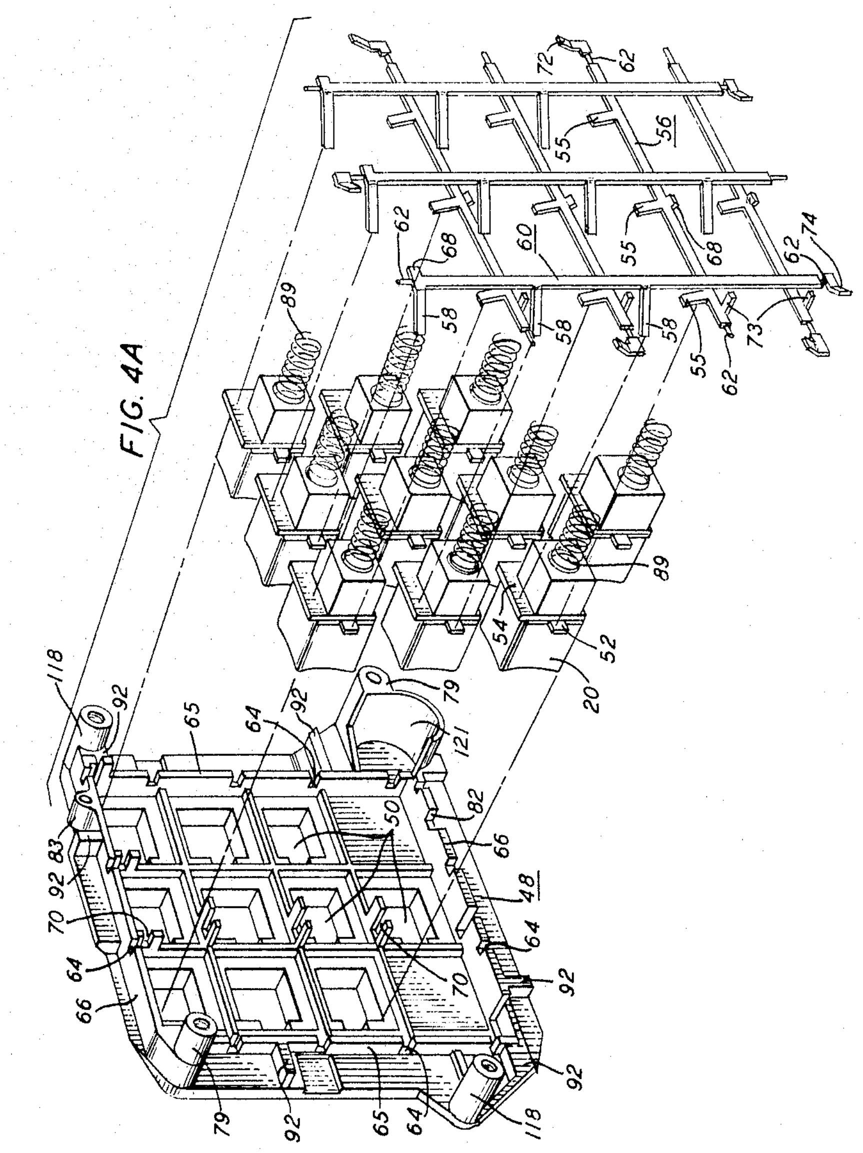
Figure 4B:
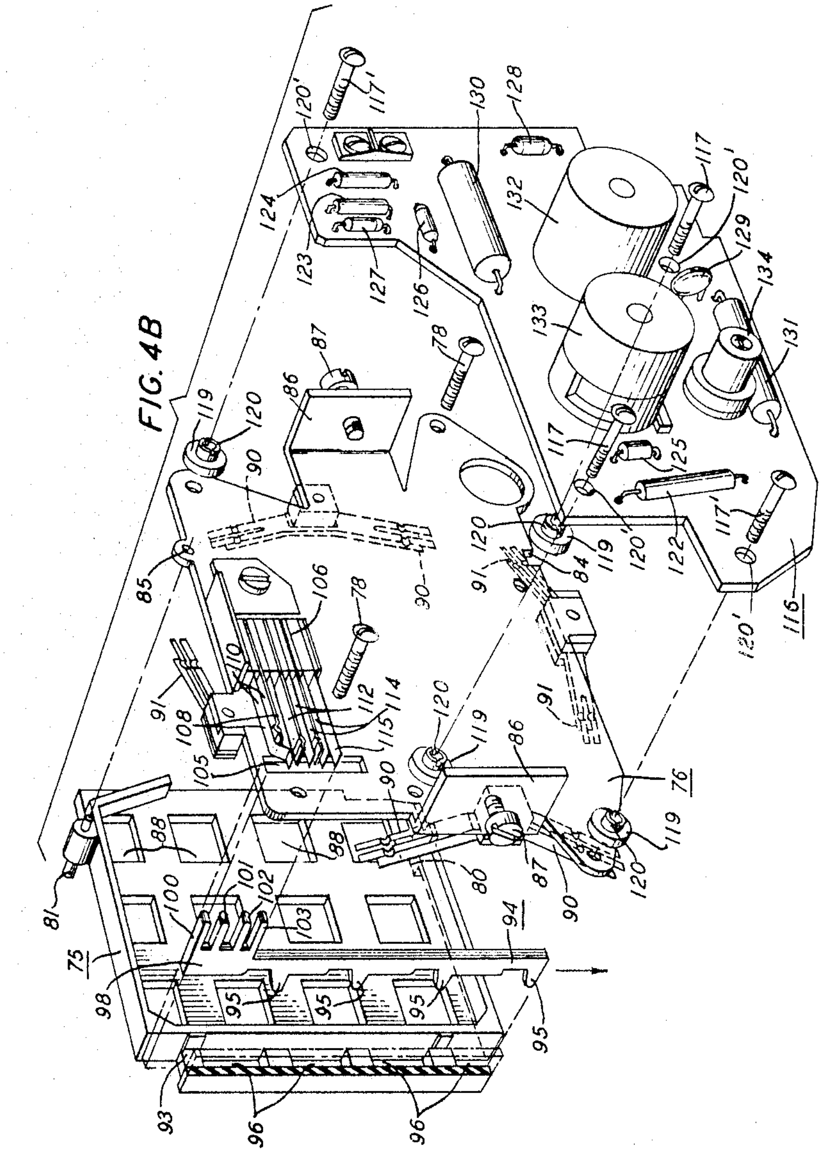
Figure 8:
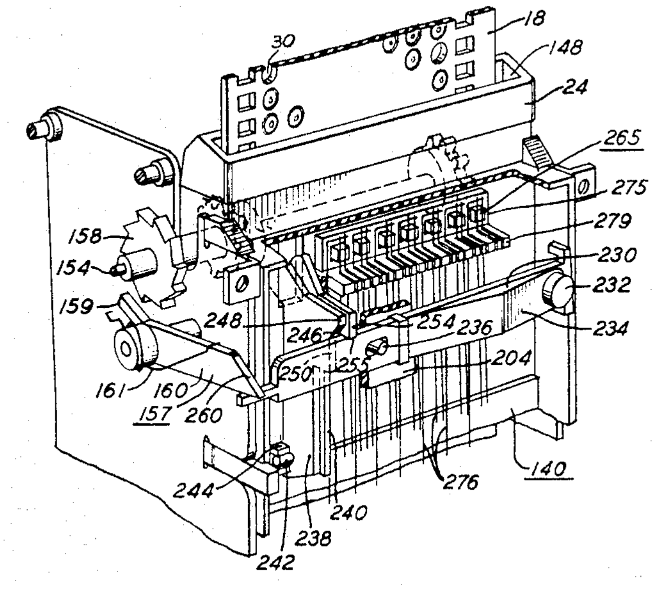
Figure 9:
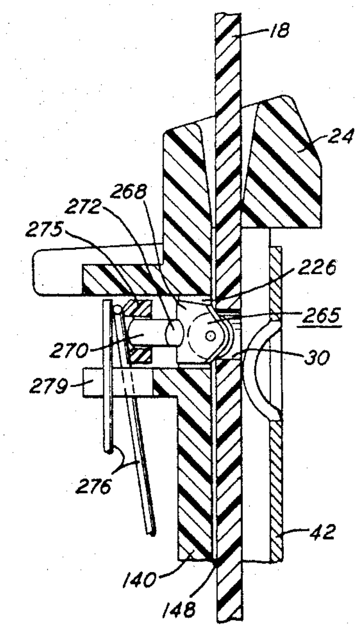
Figure 10:
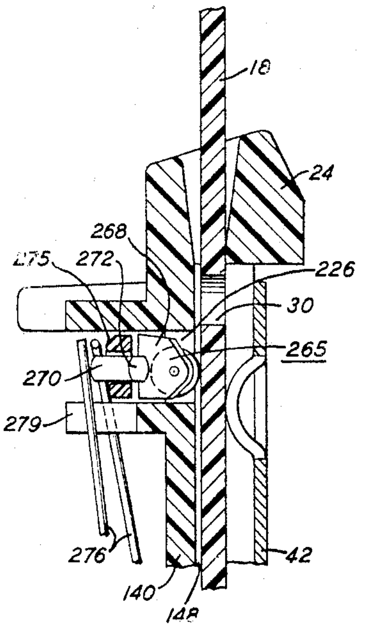
Figure 11:
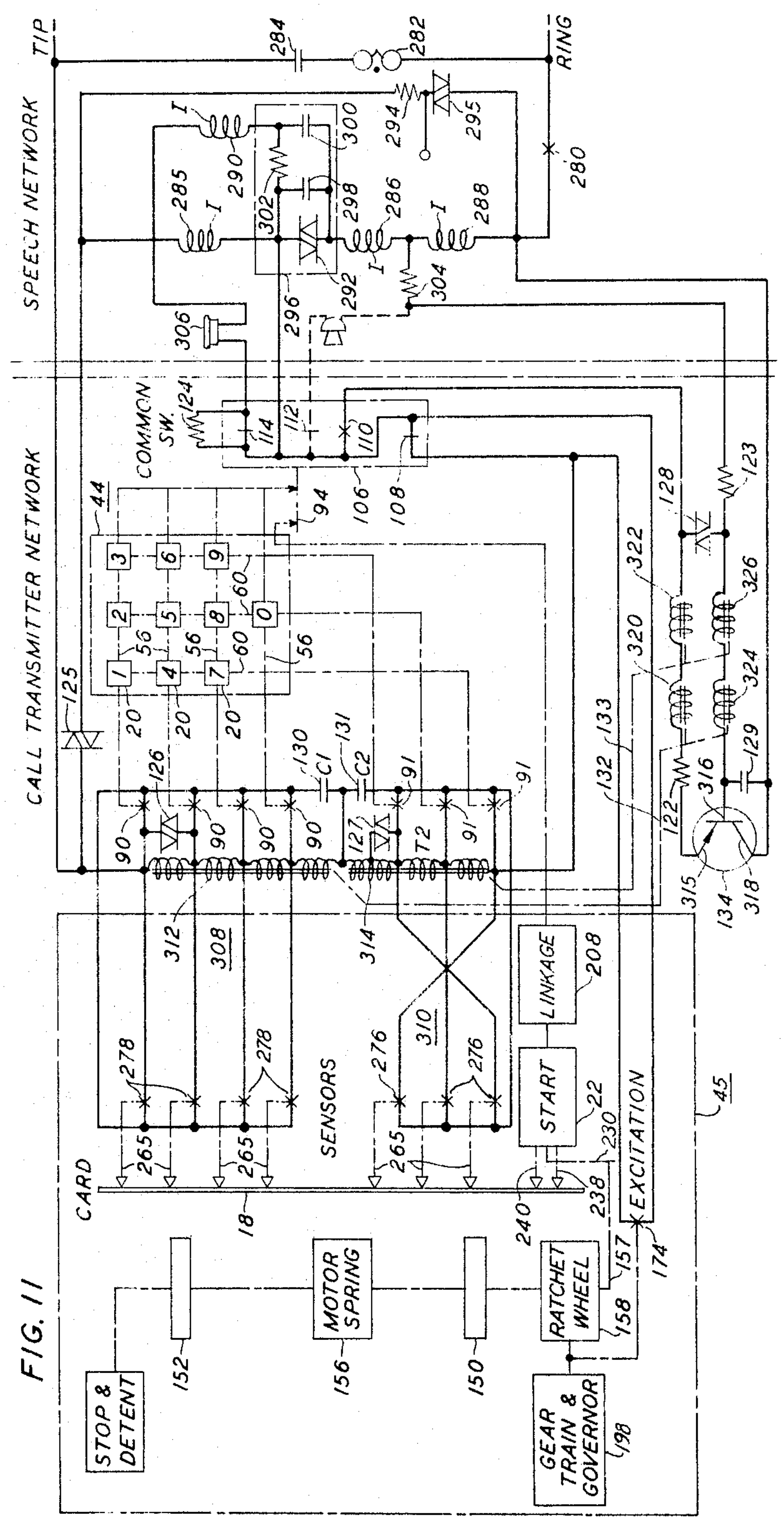

FIGS. 4A and 4B combined are an exploded perspective view of the elements comprising a pushbutton dial that is one of the major subassemblies of the call transmitter;

FIG. 5 is a bottom view of the elements of FIG. 4A assembled;

FIG. 6 is a perspective view of a repertory mechanism that is the other major subassembly of the call transmitter;

FIG. 7 is a view taken along line 7—7 of FIG. 3 showing an excitation switch;

FIG. 8 is a schematic representation of a start-stop control for the repertory mechanism;

FIGS. 9 and 10 are sectional views taken along line 9—9 of FIG. 3 showing the interaction between the encoded card, means for sensing the coding on the card, and frequency selecting spring contacts actuated responsive to the code sensing means; and FIG. 11 is a schematic diagram of a subscriber set including the call transmitter of this invention.

*General description*

Figure 1:
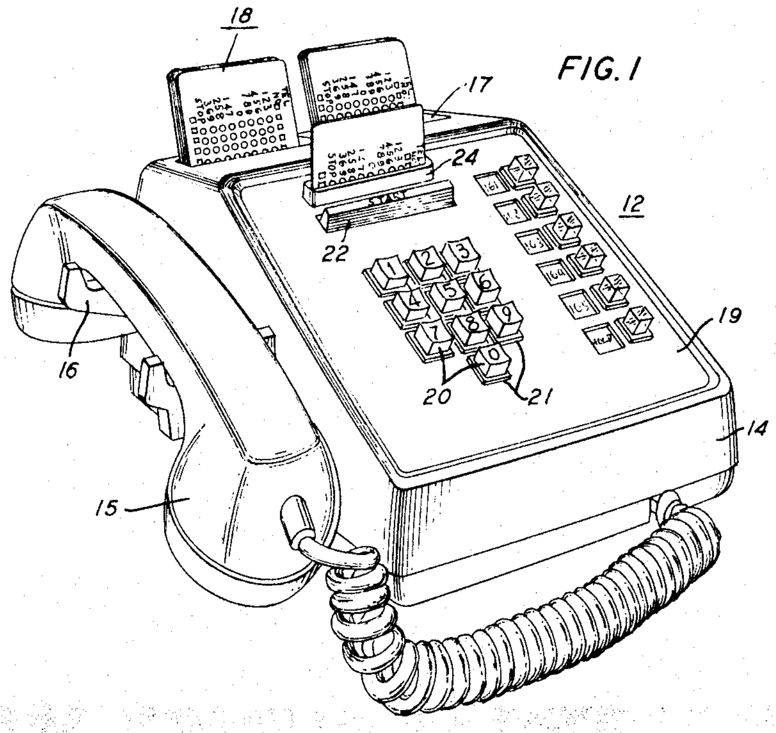
FIG. 1 is a perspective view of a telephone set including the call transmitter of this invention.

Referring to the drawing and FIG. 1 in particular, the integrated call transmitter of this invention is incorporated in a telephone set 12 comprising a base 14 and a handset 15, the handset when not in use being positioned on a switchhook 16 extending from the side of the base. The base 14 includes a pair of wells 17 in which webs or cards 18 employed in the automatic operation of the call transmitter are stored. The base 14 also includes a forwardly inclined faceplate 19 through which elements of the call transmitter extend, these elements being ten pushbuttons 20, ten guide collars 21 that respectively encompass the pushbuttons, a start bar 22, and an entryway 24. The upper surface of each pushbutton 20 is curved concavely, and one of the digits 1 through 0 appears thereon, indicating the particular digit that the pushbutton represents. Although not shown, letter groupings may appear on the upper surfaces of the pushbuttons 20 in addition to the digits.

To manually operate the call transmitter, the user lifts the handset 15 from the switchhook 16 and listens for a dial tone. Hearing a dial tone he sequentially depresses the pushbuttons 20 which correspond to the telephone number of the desired subscriber and thereby transmits signals corresponding to the telephone number to the telephone central office. To automatically operate the call transmitter, the user selects the card 18 that is coded with the telephone number of the subscriber that he wishes to call. The card 18 is placed into the entryway 24 and inserted to its full height. Next, the user removes the handset 15 from the switchhook 16 and listens for a dial tone. Hearing one, he depresses and releases the start bar 22 and thereby initiates the automatic operation of the call transmitter. The card 18 is moved out of the entryway 24, the coding on the card is sensed, and signals corresponding to the coding on the card are transmitted to the central office.

As shown in FIG. 2, the card 18 employed in the automatic operation of the call transmitter comprises a rectangular planar member that is formed to include an array of removable discs 28, the discs being arranged in fourteen transverse rows and eight longitudinal columns. The discs 28 may be removed by pressing thereon with a pencil or similar instrument, and when a disc is removed it leaves a code hole 30 in the card. Bordering the array of removable discs 28 is a pair of columns of sprocket holes 32 and 34, the purpose of which is hereinafter explained.

At the top of the card 18 an area 35 is provided for recording the name of the subscriber whose telephone nuumber is to be encoded on the card, and along one side of the card a plurality of areas 36 are provided for recording the individual digits of the subscriber's telephone number, each area 36 being in line with one of the rows of removable discs 28. Above each column of removable discs 28 particular information is provided. Above the first column there appears the word "stop." Above the second, fourth, and sixth through eighth columns there appear unique digit groupings of three digits each. Above the third column there appears a unique digit grouping of four digits and above the fifth column there appears a digit grouping of one digit. Each digit 1 through 9 appears once in the groupings above the second through fourth columns and once in the groupings above the sixth through eighth columns. The digit 0 appears in the groupings above the third and fifth columns.

To encode the card 18 with the telephone number recorded in the areas 36, the subscriber looks to see what digit is recorded adjacent to a particular row of removable discs 28. This is the digit that the row is to represent. The subscriber then observes in which two digit groupings this digit appears and removes from the row the removable discs 28 situated in the columns underlying these two digit groupings.

With regard to the removable discs 28 in the column marked "stop," one of these discs is removed from a particular row when it is desirable to stop the automatic operation of the call transmitter subsequent to the dialing of the digit represented by the previous row. For example, when the call transmitter is being used in an office served by a private branch exchange, it is necessary to dial an initial digit to gain access to an outside trunk line and then observe whether the trunk line is clear before the telephone number of the subscriber to be called can be dialed. In such a situation the removable disc 28 in the second row and beneath the heading "stop" is removed. Then when the encoded card 18 is inserted into the entryway 24 and the start bar 22 depressed, the call transmitter automatically transmits signals corresponding to the first digit and stops. Thereupon, the calling subscriber listens for a dial tone indicating that the trunk line is free, and hearing one, he again depresses the start bar 22, causing the call transmitter to transmit signals corresponding to the remaining digits encoded on the card 18.

*Mechanical description*

Turning to FIG. 3, the call transmitter includes a support 38 consisting of a pair of side plates 40 and 41 joined by a cross plate 42 (not shown). Mounted on the support 38 are two of the three subassemblies that make up the call transmitter, a pushbutton dial 44 and a signal generator. The third subassembly, a repertory mechanism 45, includes the support 38. These subassemblies will now be described.

*Pushbutton dial*

Referring now also to FIGS. 1, 4A, and 5, the pushbutton dial 44 comprises a cover member 48 having ten square holes 50 therein. Each of the holes 50 is encompassed by one of the guide collars 21, the collars being square and extending from the upper surface of the cover member 48. The holes 50 are arranged in longitudinal columns and transverse rows, and each pushbutton 20 has a square upper end thereof slidably positioned in one of the holes.

The collars 21 increase the height of the walls defining the holes 50, and the walls taper toward the upper end so that the upper inside of each collar interacts with the upper end of the pushbutton 20 positioned therewithin to guide the movement thereof. In addition, the collars 21 in projecting through the faceplate 19 of the telephone set 12 provide a rigid intermediary between the faceplate and the pushbuttons 20 that locates the pushbutton dial 44 with respect to the faceplate and eliminates the possibility of interference between pushbuttons and the faceplate, thereby assuring free operation of the pushbuttons.

Each pushbutton 20 includes a pair of flanges 52 and 54 extending laterally therefrom and between the ends thereof, the flange 52 lying in a higher plane than the flange 54. The flanges 52 and 54 extend beneath the portions of the under surface of the cover member 48 to the sides of the holes 50 and thereby limit the upward motion of the pushbuttons 20. The portions of the under surface of the cover member 48 in juxtaposition with the flanges 52 are relieved so that the flanges 52 and 54 engage corresponding under surfaces simultaneously.

The flanges 52 and 54 of each pushbutton 20 respectively overlie a lever 55 of a transverse shaft 56 and a lever 58 of a longitudinal shaft 60, the levers extending laterally from the shafts. An individual transverse shaft 56 extends along one side of each row of pushbuttons 20, and an individual longitudinal shaft 60 extends along one side of each column of pushbuttons. Thus when any pushbutton 20 is depressed, the levers 55 and 58 of a unique pair of transverse and longitudinal shafts 56 and 60 are defllected downwardly.

Each transverse shaft 56 and longitudinal shaft 60 includes journals 62 that are respectively accommodated by notches 64 in longitudinal side walls 65 and transverse side walls 66 depending from the underside of the cover member 48. The notches 64 serve as bearings in which the shafts 56 and 60 rotate, and consequently the deflection of the levers 55 and 58 of a pair of transverse and longitudinal shafts results in the rotation of the shafts.

The longitudinal side walls 65 are of a lesser height than the transverse side walls 66 so that the transverse shafts 56 lie in a higher plane than the longitudinal shafts 60. The transverse and longitudinal shafts 56 and 60 thereby rotate without interfering with one another.

Each transverse shaft 56 and longitudinal shaft 60 includes a tab 68 that extends into a slot 70 in the underside of the cover member 48 to maintain the shafts in their proper axial position. In addition, each transverse shaft 56 has both a contact actuating lever 72 at one end thereof and an operator actuating lever 73 adjacent to one end thereof, while each longitudinal shaft 60 has only a contact actutaing lever 74 at one end thereof.

Turning now to FIGS. 4A and 4B, underlying the cover member 48 is a frame member 75 and a base member 76. Fasteners 78 secure the base member 76 to bosses 79 depending from the underside of the cover member 48, and the frame member 75 is sandwiched between the base member and the cover member. To properly locate the frame member 75 with respect to the cover member 48 and the base member 76, a key 80 and a pin 81 extending upwardly and downwardly from the frame member are respectively accommodated by a notch 82 and a sleeve 83 in opposing transverse side walls 66 of the cover member and a notch 84 of an orifice 85 in opposing edges of the base member.

The base member 76 has downwardly extending lugs 86 in which fasteners 87 are threaded, and the fasteners are accommodated by slots in the side plates 40 and 41 (FIG. 3) of the support 38 to secure the base member and thereby the pushbutton dial 44 to the support.

The frame member 75 butts against the bottom edges of the transverse walls 66 and longitudinal walls 65 of the cover member 48 and thereby retains the longitudinal shafts 60 and transverse shafts 56 in the bearing notches 64. In addition, the frame member 75 has an array of square holes 88 therein that receive square lower ends of the pushbuttons 20, the walls defining the holes 88 interacting with the lower ends of the pushbuttons 20 to guide the movement thereof. The holes 88 in the frame member 75 are in alignment with the holes 50 in the cover member 48, and the walls defining the holes 88 thereby cooperate with upper inside edges of the collars 21 (FIG. 3) of the cover member to direct the movement of the pushbuttons 20 parallel to the longitudinal axes thereof.

The underside of each pushbutton 20 has a hole therein and a helical compression spring 89 positioned in each hole bears against the base member 76 to bias the pushbuttons upwardly and normally maintain the pushbuttons in an extended position. When a pushbutton 20 is depressed, the spring 89 is compressed within the hole in the pushbutton and the downward movement of the pushbutton is arrested by the engagement of the underside thereof with the base member 76.

Pairs of normally open frequency selecting spring contacts 90 and 91 are insulatedly secured to the upper surface of the base member 76. The pairs of spring contacts 90 and 91 are disposed about the periphery of the base member 76, and the lower contact of each pair underlies and is prestressed against a prestressing stud 92 depending from the underside of the cover member 48. The upper contact of each pair of spring contacts 90 underlies and is prestressed against the actuating lever 72 of an individual transverse shaft 56, and the upper contact of each pair of spring contacts 91 underlies and is prestressed against the actuating lever 74 of an individual longitudinal shaft 60. The prestressing of the spring contacts assures the generation of good contact pressure with very small travel of the spring contacts.

The upper contacts of the pairs of frequency selecting spring contacts 90 and 91 respectively act to maintain the levers 55 of the transverse shafts 56 in engagement with the underside of the pushbutton flanges 52 and the levers 58 of the longitudinal shafts 60 in engagement with the underside of the pushbutton flanges 54, and when the pushbuttons 20 are in their extended position, the upper contacts are spaced from the lower contacts. However, when any one of the pushbuttons 20 is depressed, the transverse shaft 56 and longitudinal shaft 60 extending alongside thereof are rotated, and the respective contact actuating levers 72 and 74 of the shafts move the upper contacts of the pairs of spring contacts 90 and 91 associated with the levers into engagement with the lower contacts. The upper contacts deflect the lower contacts from their associated prestressing stud 92, and relative motion occurs between the contacts that provides a wiping action of the contact surfaces.

It is to be noted that the positioning of the pairs of frequency selecting spring contacts 90 and 91 around the periphery of the base member 76 places them out in the open and thereby makes them readily accessible for adjustment and cleaning without having to disassemble the pushbutton dial 44. Furthermore, as seen in FIG. 5 from the positions of the contact actuating levers 72 and 74 and the studs 92, the cover member 48 overlies the pairs of frequency selecting spring contacts 90 and 91 and thereby prevents damage to the spring contacts when the pushbutton dial 44 is being handled.

The underside of the frame member 75 includes a channel 93 that extends along a longitudinal side thereof, and captured within the channel and between the frame member and the base member 76 is a slidably displaceable switch operator 94. The operator 94 has four spaced cam portions 95 extending upwardly therefrom that respectively extend through spaced holes 96 in the channel 93. Each cam portion 95 extends into engagement with the operator actuating lever 73 of an individual transverse shaft 56, and upon the rotation of any one of the transverse shafts by the depression of a pushbutton 20, the operator actuating lever thereof interacts with the cam portion with which it is in engagement to displace the operator 94 along the channel 93 in the direction of the arrow in FIG. 4B.

The operator 94 has a contact actuating comb portion 98 extending downwardly therefrom that consists of spaced teeth 100, 101, 102, and 103. The teeth 100 through 103 extend through a slot 105 in the base member 76 and into engagement with a common switch 106 secured to the underside of the base member. The common switch 106 comprises a make-before-break combination consisting of normally closed contacts 108 and normally open contacts 110, two pairs of normally closed contacts 112 and 114, and a biasing spring 115. The movable contact members of the make-before-break combination, the normally closed contacts 112, and the normally closed contacts 114 respectively extend into juxtaposition with the teeth 100, 101, and 102 and the biasing spring 115 extends into engagement with the tooth 103.

The biasing spring 115 biases the cam portions 95 of the operator 94 toward the operator actuating levers 73, and thereby tends to maintain the cam portions in engagement with the levers. The teeth 100, 101, and 102 are spaced so that when the operator 94 is displaced by the depression of a pushbutton 20, the contacts are actuated in the following sequence: the normally closed contacts 114 are opened, the normally closed contacts 112 opened, the normally open contacts 110 are closed, and the normally closed contacts 108 are opened. The sequence is reversed upon the return movement of the operator 94.

From the foregoing description it can be seen that the depression of any pushbutton 20 serves to close one pair of frequency selecting spring contacts 90 and one pair of frequency selecting spring contacts 91 and to operate the common switch 106. The displacement of the operator 94 is arranged so that the pairs of frequency selecting spring contacts 90 and 91 are closed before the normally closed contacts 108 of the common switch are opened.

Underlying the base member 76 alongside of the common switch 106 is a printed circuit board 116. A pair of fasteners 117 secure the printed circuit board 116 directly to the base member 76, and a pair of fasteners 117' extend through holes in the base member to secure the printed circuit board to bosses 118 depending from the cover member 48. The fasteners 117 and 117' extend through dielectric bushings 119 mounted in the printed circuit board 116, the bushings having slotted collars 120 that are forced into holes 120' in the printed circuit board. The bushings 119, which are thereby held captive in the holes 120', space the printed circuit board 116 from the underside of the base member 76. The foregoing arrangement provides support for the printed circuit board 116 with a minimum of fasteners, and where maintenance of the board is required, it permits the board to be removed from the base member 76 without disturbing the mechanical elements, and where maintenance of the mechanical elements is required, it permits the board to be removed as a unit with the base member without disturbing the electrical elements on the board.

A plurality of electrical components are mounted on the underside of the printed circuit board 116. Connections are made from the components to printed circuitry (not shown) on the upper surface of the printed circuit board 116 by inserting the leads of the components through small holes in the board. Mechanical connection as well as electrical connection is then made by a process such as solder dipping.

Although the pushbutton dial 44 as disclosed in not illuminated, it may be illuminated by the addition of a light bulb that is positioned adjacent to a reflector 121 depending from one corner of the cover member 48 and by the addition of a generally rectangular light guide that is positioned between the frame member 75 and the base member and is confined within the walls depending from the frame member. The pushbuttons 20 would then be formed from a translucent material, and the opaque characters on the pushbuttons would be viewed against an illuminated background. Furthermore, although the pushbutton dial is disclosed as being a subassembly of a call transmitter that may be either manually or automatically operated to generate signals of more than one frequency, it may be used independently as a manual multifrequency call transmitter.

*Multifrequency signal generator*

The multifrequency signal generator of the call transmitter comprises the common switch 106 in combination with the electrical components mounted on the underside of the printed circuit board 116. These components consist of resistors 122, 123, 124; varistors 125, 126, 127, and 128; capacitors 129, 130, and 131; transformers 132 and 133; and a transistor 134. The interaction between these elements is described in the electrical description of the call transmitter hereinbelow.

*Repertory mechanism*

Referring now to FIGS. 3 and 6, the repertory mechanism 45 of the call transmitter includes an upright card guide 140 and front plate 142, the card guide and front plate extending and being supported by the side plates 40 and 41 of the support 38. The card guide 140 has upper bosses 144 that rest on upper edges of the side plates 40 and 41 and lower bosses 145 that are accommodated by slots in the side plates. The front plate 142 has depending legs 146 that are accommodated by notches in the side plates 40 and 41 and diverging tabs 147 that are fastened to diverging tabs on the side plates. As the front plate 142 is situated in front of the card guide 140, the front plate holds the card guide in place.

The card guide 140 includes the entryway 24 and when the encoded card 18 is inserted into the entryway, it directs the card into a slot 148 (FIG. 9) between the card guide and the cross plate 42 of the support 38. The card guide 140 and cross plate 42 cooperate to direct the columns of sprocket holes 32 and 34 (FIG. 2) in the card 18 respectively into engagement with a pair of spaced sprocket wheels 150 and 152 fixedly mounted on a shtaft 154. The shaft 154 is journaled in and extends between the side plate 41 and an auxiliary plate 155 secured to and spaced from the side plate 40. A motor spring 156 is disposed about the shaft 154 between the sprocket wheels 150 and 152, and one end of the motor spring is hooked into a cavity in the sprocket wheel 152 while the other end of the motor spring is secured to a spring retainer (not shown) rotatively mounted on the shaft 154 adjacent to the sprocket wheel 150 and held immobile.

The interaction between the columns of sprocket holes 32 and 34 (FIG. 2) and the sprocket wheels 150 and 152 as the card 18 is inserted into the slot 148 results in the sprocket wheels and thereby the shaft 154 being rotated in a clockwise direction as viewed in FIG. 6. Since one end of the motor spring 156 is held immobile while the other end rotates with the sprocket wheel 152, the rotation of the sprocket wheel winds up the motor spring to store energy therein, the motor spring tending to rotate the sprocket wheels 150 and 152 in a counterclockwise direction.

A pawl 157, pivotally mounted on the side plate 40, cooperates with a ratchet wheel 158 fixedly mounted on the shaft 154 to serve as a latch for the sprocket wheels 150 and 152. The pawl 157 has a rearwardly extending arm 159 that extends into juxtaposition with the ratchet wheel 158 and a forwardly extending arm 160 that extends beyond the forward surface of the front plate 142. A spring member 161 biases the pawl 157 in a clockwise direction as viewed in FIG. 6 and thereby biases the arm 159 into engagement with the teeth on the ratchet wheel 158.

The teeth on the ratchet wheel 158 are shaped so that with the arm 159 of the pawl 157 in engagement therewith the ratchet wheel is able to rotate in a clockwise direction but is unable to rotate in a counterclockwise direction. Hence, the engagement of the arm 159 with the ratchet wheel 158 permits the insertion of the card 18 into the slot 148 but prevents its removal. To move the card 18 out of the slot 148 the arm 159 is, in a manner hereinafter described, disengaged from the ratchet wheel 158 and the motor spring 156 is thereby permitted to rotate the sprocket wheels 150 and 152 in a counterclockwise direction.

A detent 162 rotatively mounted on the shaft 154 adjacent to the sprocket wheel 152 interacts with a stop 163 fastened to the side plate 41 and a tab 164 protruding from the side of the sprocket wheel 152 to provide a final stop for the sprocket wheels 150 and 152. The detent 162 includes a pair of radially extending vanes 165 and 166 that are disposed approximately 90 degrees apart and occupy nonoverlapping positions along the axial length of the detent. The stop 163 extends into the path of rotation of the vane 165 but not into the path of rotation of the vane 166 while the tab 164 extends into the path of rotation of the vane 166 but not into the path of rotation of the vane 165.

As the card 18 is moved out of the slot 148 by the counterclockwise movement of the sprocket wheels 150 and 152, the tab 164 moves into engagement with the vane 166 and rotates the detent 162 in a counterclockwise direction. The rotation of the sprocket wheels 150 and 152 is arrested when the counterclockwise movement of the detent 162 moves the vane 165 into engagement with the stop 163. The sprocket wheels 150 and 152 are in this position disengaged from sprocket holes 32 and 34 (FIG. 2) in the card 18 and the card may, therefore, be readily removed from the entryway 24.

A gear 168 is fixedly mounted on the shaft 154 alongside of the ratchet wheel 158. The gear 168 meshes with a pinion 170 that is fixedly mounted on a shaft 171, the shaft being journaled between the auxiliary plate 155 and a housing 172 of an excitation switch 174 shown in FIG. 7. The housing 172 includes a sleeve portion 175 that is journaled in a circular hole in the side plate 40, and the sleeve portion has a lip 176 and a flange 177 that abut against opposite surfaces of the side plate adjacent to the hole to hold the housing in place.

The housing 172 insulatedly supports a pair of bifurcated spring contacts 178 and 180 and the free ends of the spring contacts bear against the face of a dielectric disc 182 that is fixedly mounted on the shaft 171 and positioned within the sleeve portion 175 of the housing. A conductor 184, consisting of a ring 185 from which two opposing wedge shaped segments 186 radially extend, is embedded in the face of the disc 182.

When the disc 182 is rotated, the contact 178 describes a circular path thereon that includes the ring 185 of the conductor 184, and the contact 180 describes a circular path that intersects the segments 186 of the conductor 184. Consequently, when the contact 180 is in engagement with the segments 186, a conductive path is provided between the contacts 178 and 180, and the excitation switch 174 is closed, and when the contact 180 is in engagement with the dielectric portion of the disc 182, no conductive path is provided between the contacts 178 and 180 and the excitation switch is open.

The housing 172 is itself rotatable about the shaft 171, and this feature permits the excitation switch 174 to be adjusted to open and close in a particular relationship with respect to contacts, hereinafter described, that are closed responsive to the coding on the card 18 as the card is moved out of the slot 148. However, the rotation of the housing 172 is limited to an angular movement of about 30 degrees by fastener 188 that extends through an arcuate slot 190 in the housing and is threaded into the side plate 40. The fastener 188 is tightened to hold the housing 172 stationary once the above adjustment has been made.

Referring again to FIG. 3, a gear 192 fixedly mounted on the shaft 171 adjacent to the pinion 170 meshes with a pinion 193 that is rotatively mounted on a shaft 194 journaled between the side plate 40 and the auxiliary plate 155. The pinion 193 is coupled by a band clutch 195 to a gear 196 fixedly mounted on the shaft 194, and the gear 196 drives a governor 198 of the type disclosed in Patent No. 3,080,020 issued on March 5, 1963, to H. J. Hershey, the governor being mounted between the side plate 40 and the auxiliary plate 155.

The band clutch 195 positively couples the pinion 193 to the gear 196 when the pinion 193 is rotated in a counterclockwise direction, as when the card 18 is being moved out of the slot 148. The band clutch 195 does not positively couple the pinion 193 to the gear 196 when the pinion 193 is rotated in a clockwise direction, as when the card 18 is being inserted into the slot 148. Thus the governor 198 acts to regulate the operation of the excitation switch 174 and the movement of the card 18 only when the card is moving out of the slot 148. It does not provide any regulation during the movement of the card 18 into the slot 148.

Turning now to FIG. 6, spaced nailhead posts 200 extend from the forward surface of the front plate 142 and are accommodated by spaced keyhole slots 202 in a plunger 204. The nailhead posts 200 and keyhole slots 202 cooperate to slidably support the plunger 204 on the front plante 142 and to direct the movement of the plunger along a vertical path parallel to the surface of the front plate. The start bar 22 is part of the plunger 204, and when the start bar is depressed it moves the plunger to a downward position, the plunger when the bar is released being returned to an upward position by a spring 205.

The plunger 204 includes an inclined cam portion 206 and a vertical cam portion 207 that interact with a linkage 208 comprising a compliant member 210 and a rigid member 212. The compliant and rigid members 210 and 212 are pivotally mounted at the lower ends thereof on a pin 214, the pin being mounted in a bracket 215 extending forwardly from the card guide 140. The rigid member 212 has a nose portion 218 and a tab portion 220 that respectively extend into juxtaposition with the operator 94 and an edge of the base member 76 of the pushbutton dial 44. In addition, the rigid member 212 has a pair of laterally extending fingers 222 and 224 between which are positioned arms 225 and 226 of the compliant member 210. The arms 225 and 226 must be flexed toward one another to be positioned between the fingers 222 and 224, thus the arms are mtaintained in a prestressed condition by the fingers.

The arm 225 has a follower portion 228 that extends into the path of travel of the cam portions 206 and 207 on the plunger 204, and when the start bar 22 is depressed the inclined cam portion 206 engages the follower portion 228 and commences to deflect the arm 225 in the direction of arm 226. The arm 226 is thereby pressed harder against the finger 224 of the rigid member 212, causing the nose portion 218 of the rigid member to press against the operator 94 and the operator in turn to press on the spring contacts of the common switch 106 (FIG. 4B). The stiffness of the compliant member 210 exceeds the stiffness of the common switch 106 and consequently the deflection of the follower portion 228 by the inclined cam portion 206 causes the linkage 208 to displace the operator 94, the linkage itself pivoting in a clockwise direction.

As the downward movement of the plunger 204 continues, the movement of the inclined cam portion 206 past the follower portion 228 continues to displace the operator 94 and thereby pivot the linkage 208 until the pivoting of the linkage is arrested by the engagement of the tab portion 220 of the rigid member 212 with the edge of the base member 76. In this position of the linkage 208 the operator 94 is displaced through the necessary distance to actuate the common switch 106.

Further downward movement of the plunger 204 beyond this point moves first the crest of the inclined cam portion 206 and then the vertical cam portion 207 into engagement with the following portion 228, the vertical cam portion being at the same height as the crest of the inclined cam portion. The movement of the crest of the cam portion 206 into engagement with the follower portion 228 further deflects the arm 225 of the compliant member 210 toward the arm 226, and since the linkage 208 is blocked by the base member 76, actual movement of the arm 225 toward the arm 226 occurs. The movement of the vertical cam portion 207 into engagement with the follower portion 228 maintains the arm 225 in a deflected condition. This deflection of the arm 225 toward the arm 226 compensates for any variations in positions of the pushbutton dial 44 and the repertory mechanism 45 and assures that when the plunger 204 is in a downward position, that is, when the vertical cam portion 207 is in engagement with the follower portion 228, the linkage 208 is positioned in engagement with the base member 76 and the common switch 106 is thereby actuated by the operator 94.

When the plunger 204 returns to its upward position, the deflected contact springs of the common switch 106 return the operator 94 to its undisplaced position, and the operator in turn pivots the linkage 208 in a counterclockwise direction.

Positively coupled to the plunger 204 is a latch member 230. One end of the latch member 230 is pivotally mounted on a nailhead post 232 extending from the forward surface of the front plate 142 while the other end of the latch member extends into juxtaposition with the forwardly extending arm 160 of the pawl 157. A leaf spring 234 secured to the latch member 230 biases it toward the front plate 142 and maintains the latch member positioned over a forwardly extending stud 236 on the plunger 204. Consequently, when the plunger 204 is moved downward, the latch member 230 is pivoted downward, and when the plunger is moved upward, the latch member is pivoted upward, the latch member moving in a generally planar path.

Referring now also to FIG. 8, the spring 234 in maintaining the latch member 230 positioned over the stud 236 biases the latch member toward a spacing member 238 and a hole detecting member 240. The spacing member 238 and detecting member 240 are positioned side by side one another between the card guide 140 and the front plate 142, and the lower ends of the spacing and detecting members are pivotally mounted on a pin 242 that is mounted in a bracket 244 projecting from the front surface of the card guide. The upper ends of the spacing member 238 and detecting member 240 protrude forwardly through a hole in the front plate 142 into juxtaposition with the latch member 230 and rearwardly through a hole in the card guide 140 into the slot 148.

The portion of the upper end of the spacing member 238 that protrudes into juxtaposition with the latch member 230 includes a deflecting surface having a forward surface 248 that extends generally parallel to the path of movement of the latch member 230, a slightly inclined surface 250 and a sharply inclined surface 246 intermediate and in series with the forward surface and the slightly inclined surface. The portion of the upper end of the spacing member 238 that protrudes into the slot 148 is tapered and has a card engaging surface 252 at the rear end thereof. The spacing member 238 is located so that when the card 18 is positioned within the slot 148, the card engaging surface 252 of the spacing member is contiguous with the nonperforatable portion of the card between the column of sprocket holes 32 and the first column of removable discs 28, and thus the spacing member rides on the surface of the card.

The portion of the upper end of the detecting member 240 that protrudes into juxtaposition with the latch member 230 includes a forward surface 254 that extends generally parallel to the latch member's path of movement and an arresting surface 255 that extends generally perpendicular to the latch member's path of movement, and the portion of the upper end of the detecting member that protrudes into the slot 148 comprises a finger 256 having a card engaging surface 258. The detecting member 240 is located so that when the card 18 is positioned within the slot 148, the card engaging surface 258 of the detecting member is contiguous with the first column of removable discs 28. As a result, the detecting member 240 is movable between a first position wherein the card engaging surface 258 rests on the surface of the card and a second position wherein the finger 256 extends into a code hole 30 in the card, the hole having been formed by the removal of one of the removable discs 28.

The distance between the card engaging surface 252 and the forward surface 248 of the spacing member 238 is somewhat greater than the distance between the card engaging surface 258 and the forward surface 254 of the detecting member 240. In addition, the arresting surface 255 of the detecting member 240 intersects the inclined surface 250 of the spacing member 238, the forward surface 254 of the detecting member extending below the forward surace 248. Furthermore, when the detecting member 240 is in its first position, the arresting surface 255 thereof extends beyond the inclined surface 250 of the spacing member 238 and when the detecting member is in its second position the arresting surface extends short of the inclined surface.

As a consequence of the above relationships, when, as shown in FIG. 6, the card 18 is positioned within the slot 148 and the plunger 204 is in its upward position, the latch member 230, under the bias of the leaf spring 234, presses against the forward surface 248 of the spacing member 238 and biases the spacing member against the card. Then when the start bar 22 is depressed and the plunger 204 and thereby the latch member 230 commence to move downward, the latch member moves from the forward surface 248 onto the inclined surface 246. As the downward motion of the plunger 204 continues, the latch member 230 moves rearward along the inclined surface 246 until it engages the forward surface 254 of the detecting member 240 whereafter it moves therealong. Shortly before the upper edge of the latch member 230 reaches the lower edge of the forward surface 254, the free end of the latch member engages an inclined surface 260 of the forwardly extending arm 160 of the pawl 157. Further downward motion of the plunger 204 results in the latch member 230 being deflected by the inclined surface 260 until it moves over the lower edge of the inclined surface whereupon it moves rearward beneath the forwardly extending arm 160 into engagement with the inclined surface 250 of the spacing member 238. The plunger 204 is at this point at the lower limit of its travel.

Upon release of the start bar 22, the spring 205 commences to move the plunger 204 and thereby the latch member 230 in an upward direction. The spring 234 maintains the latch member 230 in engagement with the inclined surface 250 of the spacing member 238, and hence as the latch member moves upward, it moves along the inclined surface. The free end of the latch member 230 being situated beneath the forwardly extending arm 160 of the pawl 157 moves the arm upward and thereby pivots the pawl in a counterclockwise direction and moves the rearwardly extending arm 159 out of engagement with the ratchet wheel 158. As shown in FIG. 8, the upward movement of the latch member 230 and thereby the upward movement of the plunger 204 is arrested by the engagement of the upper edge of the latch member with the arresting surface 255 of the detecting member 240. The plunger 204 is when arrested still situated in its previously defined downward position, that is, the vertical cam portion 207 of the plunger is in engagement with the follower portion 228 of the linkage 208, whereby the operator 94 is displaced by the linkage.

The disengagement of the rearwardly extending arm 159 of the pawl 157 from the ratchet wheel 158 permits the motor spring 156 to drive the sprocket wheels 150 and 152 in a counterclockwise direction and thereby move the card 18 out of the slot 148. As the card 18 moves out of the slot 148, the spring 234 presses the latch member 230 against the inclined surface 250 of the spacing member 238 and thereby maintains the card engaging surface 252 of the spacing member in engagement with the surface of the card. As a result, the latch member 230 is maintained a constant distance from the surface of the card.

In addition, the spring 205 acting through the plunger 204 presses the latch member 230 against the arresting surface 255 of the detecting member 240. Since the latch member 230 engages the arresting surface 255 forward of its pivotal axis, the upward force exerted by the latch member on the arresting surface produces a clockwise turning moment that presses the finger 256 of the detecting member 240 against the card 18. As a result, when a code hold 30 moves beneath the finger 256, the finger moves into the hole, the detecting member as viewed in FIG. 8 pivoting in a clockwise direction from its first to its second position. When this occurs, the arresting surface 255 of the detecting member 240 no longer impedes the movement of the latch member 230, and the plunger 204 moves to its upward position under the bias of the spring 205, the latch member pivoting upwardly therewith.

As the latch member 230 moves upward, it is deflected forward by the inclined surface 246 of the spacing member 238, and at the same time the free end of the latch member further pivots the pawl 157 in a counterclockwise direction. These two occurrences combine to move the free end of he latch member 230 beyond the end of the forwardly extending arm 160 of the pawl 157, permitting the spring 161 to pivot the pawl in a clockwise direction and move the rearwardly extending arm 159 thereof into engagement with the ratchet wheel 158 to arrest the rotation of the ratchet wheel. The rotation of the sprocket wheels 150 and 152 is thereby arrested and the movement of the card 18 is halted.

Between the time that the finger 256 of the detecting member 240 moves into a code hole 30 in the card 18 and the time that the movement of the card is halted, the card continues to move upward. The code hole 30 moves past the finger 256 and the detecting member 240 is moved from its second to its first position, the card when halted being positioned with the portion of the card between the hole and the removable disc 28 therebelow in juxtaposition with the card engaging surface 258 of the finger. Consequently, if the plunger 204 is again moved to its lowermost position, whereby the latch member 230 is moved beneath the forwardly extending arm 160 of the pawl 157, and the plunger is released, the latch member is again arrested by its engagement with the arresting surface 255 of the detecting member 240, the pawl is again pivoted to move the rearwardly extending arm 159 thereof out of engagement with the ratchet wheel 158, and the motor spring 156 is again able to rotate the sprocket wheels 150 and 152 to move the card 18 out of the slot 148.

When the bottom edge of the card 18 moves past the spacing member 238 and the detecting member 240, the forces exerted on the members by the latch member 230 cause them to pivot rearwardly into the slot 148. The latch member 230 moves rearwardly with the spacing and detecting members 238 and 240 until the rearward motion of the spacing member is arrested by its engagement with the card guide 140. The detecting member 240 continues its rearward motion, and as a result, the arresting surface 255 of the detecting member moves out of the path of the latch member 230, and the latch member and thereby the plunger 204 are able to move upward The upward movement of the latch member 230 causes the free end thereof to further pivot the pawl 157 in a counterclockwise direction, and as the latch member is in a rearward position, the free end of the latch member remains beneath the forwardly extending arm 160 of the pawl and maintains the rearwardly extending arm 159 of the pawl disengaged from the ratchet wheel 158. The final positions of the sprocket wheels 150 and 152 are consequently determined by the previously described interaction between the detent 162 (FIGF. 3), stop 163, and tab 164 rather than the interaction between the pawl 157 and the ratchet wheel 158.

When the card 18 is subsequently inserted into the slot 148, the spacing member 238 and detecting member 240 are deflected forwardly, causing the forward surface 248 of the spacing member to deflect the latch member 230 forwardly. The free end of the latch member 230 is moved beyond the end of the forwardly extending arm 160 of the pawl 157, and the spring 161 pivots the pawl in a clockwise direction to move the rearwardly extending arm 159 into engagement with the ratchet wheel 158.

Referring now to FIGS. 8, 9, and 10, as a card 18 is moved out of the slot 148 by the counterclockwise rotation of the sprocket wheels 150 and 152 (FIG. 6), the code holes 30 in the second through eighth columns of removable discs 28 in the card are detected by a row of seven dielectric sensing members 265 respectively located in seven spaced apertures 266 in the card guide 140. The spacing between the sensing members 265 is the same as the spacing between the columns of removable discs 28 in the card 18, and when the card is inserted into the slot 148, the engagement of the sprocket holes 32 and 34 with the sprocket wheels 150 and 152 locates the card so that the sensing members are in registration with the second through eighth columns of removable discs. In addition, when the card 18 is arrested by the engagement of the rearwardly extending arm 159 of the pawl 157 with the ratchet wheel 158, the sprocket wheels 150 and 152 position one of the portions of the card between two rows of removable discs 28 in juxtaposition with the row of sensing members 265.

Each sensing member 265 includes a tapered head 268 that protrudes into the slot 148, and a shaft 270 that extends from the head. Each sensing member 265 further includes a transverse arm 272 that extends laterally from both sides thereof at the juncture of the head 268 and the shaft 270. A datum bar 275 is positioned over the shafts 270 and rests on the transverse arms 272, and as the sensing members 265 are not secured to the datum bar, they are individually movable relative thereto.

A pair of normally open frequency selecting spring contacts are associated with each sensing member 265, the pairs of spring contacts associated with the sensing members positioned to engage the second through fourth columns of removable discs 28 in the card 18 being designated 276 and the pairs of spring contacts associated with the sensing members positioned to engage the fifth through eighth columns of removable discs in the card being designated 278. One contact of each pair of spring contacts 276 and 278 is L-shaped and rests on the datum bar 275, biasing it toward the transverse arms 272 of the sensing members 265. The other contact of each pair of spring contacts 276 and 278 overlies the transverse leg of the first contact and normally rests on the shaft 270 of the sensing member 265 with which it is associated, biasing the sensing member toward the slot 148.

The lower ends (not shown) of the pairs of frequency selecting spring contacts 276 and 278 are insulatedly secured in a spaced array. The upper unsecured ends of the pairs of spring contacts 276 and 278 are maintained in their proper transverse spatial relationship by the teeth of a comb-like portion 279 of the card guide 140, the teeth limiting the movement of the contacts to a direction generally perpendicular to the slot 148.

When the encoded card 18 is positioned within the slot 148 with a row of removable discs 28 in juxtaposition with the sensing members 265, each sensing member under the bias of the pair of spring contacts 276 or 278 associated therewith either rests on the surface of the card or rests in a code hole 30 in the card. Since only two code holes 30 are formed in each row of removable discs 28 to represent each digit, one code hole being formed in the second through fifth columns and the second hole being formed in the sixth through eighth columns, the majority of sensing members 265 rest on the surface of the card 18. As a result, the transverse arms 272 of the sensing members 265 resting on the surface of the card 18 maintain the datum bar 275, and thereby the individual contact of each pair of spring contacts 276 and 278 in engagement with the datum bar, a constant distance from the surface of the card. The other contact of each pair of spring contacts 276 and 278, on the other hand, moves with its associated sensing member 265.

As shown in FIG. 10, each sensing member 265 positioned on the surface of the card 18 maintains the individual contact in engagement therewith positioned a greater distance from the surface of the card 18 than the contact in engagement with the datum bar 275. Consequently, the pairs of spring contacts 276 and 278 associated with the sensing members 265 engaging the surface of the card 18 are open. Contrarily, as shown in FIG. 9, each of the two sensing members 265 positioned in code holes 30 in the card 18 moves into the slot 148 a distance exceeding the spacing between the pairs of spring contacts 276 and 278 when they are open. The individual contact in engagement with each of these sensing members 265 moves with its associated sensing member until its movement is arrested by its engagement with its mating contact resting on the datum bar 275. Consequently, the one pair of spring contacts 276 and the one pair of spring contacts 278 respectively associated with the two sensing members 265 positioned in the code holes 30 in the card 18 are closed.

When no card 18 is positioned in the slot 148, all the sensing members 265 under the bias of the pairs of spring contacts 276 or 278 associated therewith are positioned with the transverse arms thereof resting against the surface of the card guide around the apertures 266. In this condition, the contact of each pair resting on the datum bar 275 is spaced from its mating contact resting on the shaft 270 of the associated sensing member 265, and hence all the pairs of spring contacts 276 and 278 are open.

A more detailed description of web actuated switching means of this type is found in the copending application of Melville S. Hawley and Harold J. Hershey, Serial No. 175,718, filed February 26, 1962, and assigned to the assignee of this invention.

*Electrical description*

Turning now to FIG. 11, there is shown a schematic circuit diagram of the call transmitter of this invention interconnected with the speech network of a subscriber set. The subscriber set is connected through the tip and ring sides of a telephone line to a telephone central office (not shown) which includes a central office battery and a multifrequency calling signal register such as the type disclosed in Patent No. 3,076,059 issued to Larned A. Meacham and Leo Schenker on January 29, 1963, and assigned to the assignee of this invention.

The subscriber set includes normally open switchhook contacts 280 in the ring side of the telephone line and when the handset 15 (FIG. 1) is removed from the switchhook 16, the switchhook contacts close to connect the subscriber set to the central office. The subscriber set further includes a conventional ringer 282 and its associated capacitor 284 which are connected across the tip and ring sides of the telephone line intermediate the switchhook contacts 280 and the central office.

The speech network of the subscriber set is of the conventional antisidetone type and includes an induction coil I comprising windings 285, 286, 288, and 290 coupled in series aiding relationship. The windings 285, 286, and 288 are connected in series with a varistor 292, and shunting this path are a resistor 294 and a varistor 295 utilized for telephone loop length compensation, both paths being in series with the varistor 125 of the call transmitter network. The varistor 292 is connected intermediate the windings 285 and 286 and serves as a nonlinear impedance element of an antisidetone network 296 comprising capacitors 298 and 300 and a resistor 302 connected in parallel with the varistor.

The speech network further includes a transmitter circuit and a receiver circuit. The transmitter circuit comprises a resistor 304 and a telephone transmitter 305 connected in series with the normally closed contacts 112 of the common switch 106 of the call transmitter network, and one end of the transmitter circuit is connected to the junction between the winding 285 and the varistor 292 while the other end of the circuit is connected to the junction between the windings 286 and 288. The receiver circuit comprises a winding 290 of the induction coil I and a telephone receiver 306 connected in series with the normally closed contacts 114 of the common switch 106 of the call transmitter network, the normally closed contacts 114 normally shorting the resistor 124 in parallel therewith. One end of the receiver circuit is connected to the junction between the capacitor 300 and resistor 302 of the antisidetone network 296 and the other end of the circuit is connected to the junction between the winding 285 and the varistor 292.

It is seen from the above that the transmitter circuit is normally connected across the varistor 292 and the winding 286 of the induction coil I, and when the switchhook contacts 280 are closed, the transmitter 305 is energized by current flow through the transmitter circuit. Local speech at the transmitter 305 produces a voltage across the winding 286 and then, by the autotransformer action of the other windings of the induction coil I, the voltage is increased and placed across the telephone line. The voltage induced in the winding 290 of the induction coil I is substantially equal to the voltage drop across the antisidetone network 296, and therefore there is little or no voltage developed across the receiver circuit. The voltage produced by incoming speech, however, is not balanced out and appears across the receiver circuit whereby the speech is audible over the receiver 306.

The call transmitter network includes a pair of resonant circuits 308 and 310 connected in series with the normally closed contacts 108 of the common switch 106, the normally closed contacts 108 being shunted by the normally open contacts of the excitation switch 174. The resonant circuit 308 comprises the capacitor 130 arranged to be connected across the entire length or across discrete portions of a tapped winding 312 of the transformer 132 by the frequency selecting contacts 90 of the pushbutton dial or the frequency selecting contacts 278 of the repertory mechanism. The amplitude of the signal produced by the resonant circuit 308 is limited by the varistor 126, which is connected between two of the taps on the winding 312.

Similarly, the resonant circuit 310 comprises the capacitor 131 arranged to be connected across the entire length or across discrete portions of a tapped winding 314 of the transformer 133 by the frequency selecting contacts 91 of the pushbutton dial or the frequency selecting contacts 276 of the repertory mechanism. The amplitude of the signal produced by the resonant circuit 310 is limited by the varistor 127, which is connected between two of the taps on the winding 314.

The resonant circuits 308 and 310 form the frequency determining elements of the multifrequency feedback transistor oscillator comprising the transistor 134, the transformers 132 and 133, and associated circuitry. The transistor 134 includes an emitter electrode 315, a base electrode 316, and a collector electrode 318. The emitter electrode 315 is connected through the resistor 122, a winding 320 of the transformer 132, a winding 322 of the transformer 133, and the normally open contacts 110 of the common switch 106 to the junction between the winding 285 and the varistor 292. The base electrode 316 is connected through a winding 324 of the transformer 132, a winding 326 of the transformer 133, and the resistors 123 and 304 to the junction between the windings 286 and 288 of the induction coil I, and the collector electrode 318 is connected through the switchhook contacts 280 to the ring side of the telephone line. The windings 312, 320, and 324 of the transformer 132 are wound on a common core and have close magnetic intercoupling. Similarly, the windings 314, 322, and 326 of the transformer 133 are wound on a common core and are closely intercoupled. Base bias for the transistor 134 is derived from the varistor 128 connected across the base and emitter circuits, and the capacitor 129 connected across the base and collector circuits prevents parasitic high frequency oscillation.

*Operation*

Referring now to FIGS. 1 and 11, in both the manual and automatic operation of the call transmitter of this invention, the calling subscriber removes the handset 15 from the switchhook 16, thereby closing the normally open switchhook contacts 280 and connecting the subscriber set across the ring and tip sides of the telephone line. A direct current path is provided from the tip side of the telephone line through the varistor 125, the winding 285 of the induction coil I, the varistor 292, the windings 286 and 288 of the induction coil I, and the switchhook contacts 280 to the ring side of the telephone line.

As the transmitter 305 is connected through the normally closed contacts 112 of the common switch 106 and the resistor 304 across the varistor 292 and the widing 286 of the above direct current path, a portion of the line current flowing through the direct current path flows through the transmiter circuit and energizes the transmitter. In addition, as the receiver 306 is connected in series with the winding 290 of the induction coil I, the alternating current voltage produced across the windings 285, 286, and 288 by incoming speech appears across the receiver circuit and is audible to the calling subscriber over the receiver. Finally, as the windings 312 and 314 of the resonant circuits 308 and 310 respectively are connected through the normally closed contacts 108 of the common switch 106 across the varistor 125 and the winding 285 in the aforementioned direct current path, a portion of the line current flowing in the direct current path flows through the windings, storing energy therein.

Referring also to FIGS. 4A and 4B, in the manual operation of the call transmitter, the calling subscriber after listening for a dial tone commences to sequentially depress the pushbuttons 20 corresponding to the digits of the telephone number of the subscriber he wishes to call. As each pushbutton 20 is depressed, it rotates the transverse shaft 56 and longitudinal shaft 60 extending alongside thereof. As the transverse shaft 56 and longitudinal shaft 60 rotate, they respectively close the pair of frequency selecting spring contacts 90 and the pair of frequency selecting spring contacts 91 associated therewith, a different combination of pairs of frequency selecting spring contacts 90 and 91 being closed by each pushbutton 20. The closing of the pair of frequency selecting contacts 90 places the capacitor 130 across particular taps in the winding 312, and as the capacitor has a fixed capacitance, the length of the winding between these taps is determinative of the frequency at which the resonant circuit 308 oscillates. Similarly, the closing of the pair of frequency selecting contacts 91 places the capacitor 131 across particular taps on the winding 314, and as the capacitor has a fixed capacitance, the length of the winding between these taps is determinative of the frequency at which the resonant circuit 310 oscillates. The resonant circuits 308 and 310 are arranged so that they oscillate in different ranges of frequencies and thus each pushbutton 20 when depressed selects a unique pair of frequencies that represents the digit displayed on the pushbutton.

As the transverse shaft 56 and logitudinal shaft 60 rotate to respectively close pairs of frequency selecting contacts 90 and 91, the transverse shaft deflects the operator 94 to actuate the common switch 106. The actuation of the common switch 106 sequentially inserts attenuation in the receiver circuit by opening the normally closed contacts 114 to place the resistor 124 in the receiver circuit, interrupts the transmitter circuit by opening the normally closed contacts 112, enables the transistor oscillator by closing the normally open contacts 110 to connect the emitter and collector circuits across the varistor 292 and the windings 286 and 288 of the aforementioned direct current path whereby direct current is supplied to the transistor 134, and shock-excites the resonant circuits 308 and 310 by opening the normally closed contacts 108 to interrupt the flow of direct current through the windings 312 and 314 of the transformers 132 and 133 respectively.

The opening of the normally closed contacts 108 occurs subsequent to the closing of the normally open frequency selecting spring contacts 90 and 91, whereby the resonant circuits 308 and 310 oscillate at the frequencies determined by the particular frequency selecting contacts closed. The transistor 134, acting as an amplifier, sustains the shock-excited oscillations at amplitudes regulated by the varistors 126 and 127, and these oscillations are coupled into the induction coil I and thence onto the telephone line.

When a depressed pushbutton 20 is released, the normally closed contacts 108 close to terminate the oscillation of the resonant circuits 308 and 310 and once more permits current to flow through the windings 312 and 314, the normally open contacts 110 open to disable the transistor oscillator, the normally closed contacts 112 close to energize the transmitter 305, and the normally closed contacts 114 close to remove the attentuation in the receiver circuit. The call transmitter network is thereby immediately ready for the depression of another pushbutton 20 and the signaling of another digit.

Turning now to FIGS. 6 and 11, in the automatic operation of the transmitter, the calling subscriber selects the card 18 that is coded with the telephone number of the subscriber that he wishes to call and inserts the card into the slot 148. As the card 18 moves into the slot 148, the columns of sprocket holes 32 and 34 (FIG. 2) in the card respectively engage the sprocket wheels 150 and 152 and rotate the sprocket wheels and the shaft 154 in a clockwise direction, winding up the motor spring 156. In addition, the bottom edge of the card 18 engages the spacing and detecting members 238 and 240 and deflects them forwardly the spacing member in turn deflecting the latch member 230 forwardly. The free end of the latch member 230 is moved beyond the end of the forwardly extending arm 160 of the pawl 157, and the spring 161 pivots the pawl in a clockwise direction to move the rearwardly extending arm 159 into engagement with the ratchet wheel 158.

When the card 18 is fully inserted in the slot 148, the engagement of the pawl 157 with the ratchet wheel 158 locates the card with the first row of removable discs 28 immediately below the sensing members 265 (FIG. 8), and consequently all the frequency selecting spring contacts 276 and 278 are open. The engagement of the pawl 157 with the ratchet wheel 158 also locates the disc 182 (FIG. 7) of the excitation switch 174 so that the excitation switch is closed.

The calling subscriber then depresses the start bar 22 thereby moving the plunger 204 downward. The downward movement of the plunger 204 moves the inclined cam portion 206 and the vertical cam portion 207 thereof into engagement with the follower 228, causing the linkage 208 to deflect the operator 94 so as to actuate the common switch 106. As in the manual operation of the call transmitter, the actuation of the common switch 106 sequentially inserts attenuation in the receiver circuit by opening the normally closed contacts 114 to place the resistor 124 in the receiver circuit, interrupts the transmitter circuit by opening the normally closed contacts 112, and enables the transistor oscillator by closing the normally open contacts 110 to connect the emitter and collector circuits across the varistor 292 and the windings 286 and 288. The actuation of the common switch 106 also opens the normally closed contacts 108, but as the excitation switch 174 shunting the contacts 108 is closed, direct current continues to flow through the windings 312 and 314 of the resonant circuits 308 and 310.

The downward movement of the plunger 204 also pivots the latch member 230 downward, moving the free end of the latch member to a position beneath the forwardly extending arm 160 of the pawl 157. Then when the calling subscriber removes his finger from the start bar 22, the spring member 205 moves the plunger 204 and thereby the latch member 230 upward. The upward movement of the latch member 230 deflects the forwardly extending arm 160 upward and pivots the pawl 157 in a counterclockwise direction, moving the rearwardly extending arm 159 out of engagement with the ratchet wheel 158. Immediately thereafter, the upward movement of the latch member 230 and thereby the plunger 204 is arrested by the engagement of the upper edge of the latch member with the arresting surface 255 of the detecting member 240.

The disengagement of the rearwardly extending arm 159 of the pawl 157 from the ratchet wheel 158 permits the motor spring 156 to drive the sprocket wheels 150 and 152 in a counterclockwise direction so as to move the card 18 out of the slot 148, the speed at which the sprocket wheels move the card being regulated by the governor 198. As the card 18 moves out of the slot 148, each row of removable discs 28 (FIG. 2) is sensed by the detecting member 240 and the sensing members 265. Since each digit is represented by one code hole 30 in the second through fifth columns and one code hole in the sixth through eighth columns, when the sensing members 265 in juxtaposition therewith move into the code holes, one pair of the normally open frequency selecting spring contacts 276 and one pair of normally open frequency selecting spring contacts 278 close to respectively place the capacitors 130 and 131 across particular taps on the windings 312 and 314 of the transformers 132 and 133. The taps on the windings 312 and 314 across which the capacitors 130 and 131 are placed by the closing of the frequency selecting contacts 276 and 278 are the same taps that the capacitors would be placed across by the closing of the frequency selecting contacts 90 and 91 due to the depression of a pushbutton 20 displaying the same digit that the row of displaceable discs is coded to represent.

Immediately after the closing of the frequency selecting contacts 276 and 278, the excitation switch 174 opens interrupting the flow of direct current through the windings 312 and 314 and thereby shock-exciting the resonant circuits 308 and 310 into oscillation at the frequency determined by the closed frequency selecting contacts. The transistor 134 sustains the shock-excited oscillations, and these oscillations are coupled into the induction coil I and thence onto the telephone line.

Immediately before the two sensing members 265 positioned in the code holes 30 in the card 18 move out of these holes, the excitation switch 174 closes, terminating the oscillation of the resonant circuits 308 and 310 and permitting direct current to again flow through the windings 312 and 314. The two sensing members positioned in the code holes 30 then move out of the holes to open the two closed frequency selecting contacts 276 and 278 associated therewith. Thereafter the next row of removable discs 28 moves into juxtaposition with the sensing members 265 and two more sensing members move into the code holes in that row. The above cycle repeats itself until signals representing all the digits encoded on the card 18 have been transmitted to the central office.

When the counterclockwise movement of the sprocket wheels 150 and 152 moves the bottom edge of the card 18 past the spacing and detecting members 238 and 240, they move rearward permitting the latch member 230 and thereby the plunger 204 to move upward. The linkage 208 is no longer deflected against the operator 94 by the cam portions 206 and 207 on the plunger 204, and the operator, under the bias of the deflected contact springs of the common switch 106, moves rearward. As a result, the normally closed contacts 108 close to short out the excitation switch 174, the normally open contacts 110 open to disable the transistor oscillator, the normally closed contacts 112 close to energize the transmitter 305, and the normally closed contacts 114 close to remove the attenuation from the receiver circuit.

The counterclockwise movement of the sprocket wheels 150 and 152 is arrested by the engagement of the tab 164 (FIG. 3) on the sprocket wheel 152 with the vane 166 of the detent 162, the detent having been rotated to move the vane 165 thereof into engagement with the stop 163. In this final stop position, the excitation switch 174 is open so as not to interfere with the manual operation of the call transmitter, and the card 18 is removable from the entryway 24.

What is claimed is:

1. An integrated call transmitter for a telephone substation having a direct current path including impedance means, the call transmitter permitting either manual or automatic operation, the automatic operation being responsive to a code bearing member having each digit of a number to be called spacedly encoded thereon, the call transmitter comprising:

a multifrequency signal generator including a pair of resonant circuits adapted to resonate at discrete frequencies, normally closed contacts for connecting the resonant circuits across the impedance means in the direct current path to store energy in the resonant circuits, an amplifying means coupled to the resonant circuits in such manner as to sustain the resonating of the resonant circuits, and normally open contacts for connecting the amplifying means across the impedance means in the direct current path to enable the amplifying means;

manual means for operating the signal generator comprising a plurality of pushbuttons, each pushbutton being associated with a different digit, a first plurality of pairs of contacts for selecting discrete frequencies of the resonant circuits, each first pair of frequency selecting contacts being associated with an individual frequency, and a displaceable member for sequentially closing the normally open contacts to enable the amplifying means and open the normally closed contacts to shock-excite the resonant circuits into oscillation, each pushbutton being operative to actuate a unique two first pairs of frequency selecting contacts and to actuate the displaceable member; and automatic means for operating the signal generator comprising a plurality of pairs of contacts for selecting discrete frequencies of the resonant circuits, each pair of frequency selecting contacts being associated with an individual frequency, a code sensing member associated with each second pair of frequency selecting contacts for actuating the contacts responsive to the coding on the code bearing member, means for moving the code bearing member past the sensing members, a start member for initiating the operation of the moving means, the operation of the start member actuating the displaceable member and the movement of the code bearing member past the sensing members causing periodic actuation of discrete pairs of sensing members, and switching means connected in parallel with the normally closed contacts and coupled to the moving means, the switching means shorting the normally closed contacts between each actuation of the sensing members by the coding on the code bearing medium.

2. An integrated call and data transmitter permitting either manual or automatic operation, the automatic operation being responsive to a code bearing member having each digit of a number to be called or data to be transmitted spacedly encoded thereon, the call and data transmitter comprising:

a multifrequency signal generator including a pair of resonant circuits adapted to resonate at discrete frequencies, an amplifying means coupled to the resonant circuits in such manner as to sustain the resonating of the resonant circuits, and switching means for enabling the amplifying means;

manual means for operating the signal generator comprising a plurality of pushbuttons, each pushbutton being associated with a different digit, a first plurality of pairs of contacts for selecting discrete frequencies of the resonant circuits, each first pair of frequency selecting contacts being associated with an individual frequency, and a displaceable member for actuating the switching means, each pushbutton being operative to actuate a unique two first pairs of frequency selecting contacts and displace the displaceable member to actuate the switching means; and automatic means for operating the signal generator comprising a second plurality of pairs of contacts for selecting discrete frequencies of the resonant circuits, each second pair of frequency selecting contacts being associated with an individual frequency, a code sensing member associated with each second pair of frequency selecting contacts for actuating the contacts responsive to the coding on the code bearing member, means for moving the code bearing member past the sensing members, a start member for initiating the operation of the moving means, the actuation of the start member displacing the displaceable member to actuate the switching means and the movement of the code bearing member past the sensing members causing periodic actuation of discrete pairs of sensing members.

3. An integrated call and data transmitter permitting either manual or automatic operation, the automatic operation being responsive to a code bearing medium having each digit of a number to be called or data to be transmitted spacedly encoded thereon, the call and data transmitter comprising:

an alternating current signal generator including a resonant circuit adapted to resonate at discrete frequencies, an amplifying means for sustaining the resonating of the resonant circuit, and switching means for enabling the amplifying means;

manual means for operating the signal generator comprising a plurality of pushbuttons, each pushbutton being associated with a different digit, and each pushbutton being operative to select a discrete frequency of the resonant circuit and actuate the switching means; and automatic means for operating the signal generator comprising means for sensing the coding on the code bearing medium, means for moving the code bearing medium and the sensing means relative to one another, means for initiating the operation of the moving means, the actuation of the initiating means operating the switching means, and the relative movement between the code bearing medium and the sensing means causing the periodic actuation of the sensing means by the coding on the code bearing medium, the actuated sensing means being operative to select a discrete frequency of the resonant circuit.

No references cited.

KATHLEEN H. CLAFFY, *Primary Examiner.*

J. W. JOHNSON, *Assistant Examiner.*